US012743294B2

United States Patent
(12) United States Patent
Lee et al.

(10) Patent No.: US 12,743,294 B2
(45) Date of Patent: Sep. 22, 2026

(54) DE-CENTRALIZED WORKFLOW EXECUTION BASED ON SEQUENTIALLY TRANSFERRING CONTROL OF AN EXECUTION PROCESS AMONG A PLURALITY OF VIRTUAL MACHINES

(71) Applicant: Oracle International Corporation, Redwood Shores, CA (US)

(72) Inventors: Vivian Qian Lee, Berkshire (GB); Lyudmil Valentinov Pelov, Hamburg (DE); Qiu Qin, Centreville, VA (US); Daren Race, Montara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 820 days.

(21) Appl. No.: 17/852,877

(22) Filed: Jun. 29, 2022

(65) Prior Publication Data

US 2024/0004682 A1 Jan. 4, 2024

(51) Int. Cl.
*G06F 9/455* (2018.01)

(52) U.S. Cl.
CPC ................................ *G06F 9/45558* (2013.01)

(58) Field of Classification Search
None
See application file for complete search history.

(56) References Cited

U.S. PATENT DOCUMENTS 6,237,143 B1 * 5/2001 Fontana .................... G06F 8/20 717/137
7,127,520 B2 10/2006 Ladd et al.
8,811,740 B1 * 8/2014 Brendel .................... G06T 5/40 382/167
10,698,668 B1 * 6/2020 Pohlack .................... G06F 8/71
11,307,885 B1 * 4/2022 Luciano ................ G06F 9/5088
12,197,960 B1 * 1/2025 Kakovitch ............ G06F 9/4881
2005/0060704 A1 * 3/2005 Bulson .................. G06F 9/5077 718/1
2005/0086640 A1 * 4/2005 Kolehmainen ......... G06F 9/445 717/170
2005/0131899 A1 * 6/2005 Dvorkin .................. G06F 9/526

(Continued)

OTHER PUBLICATIONS

"Argo Workflow Trigger", Retrieved from https://argoproj.github.io/argo-events/sensors/triggers/argo-workflow/, Retrieved on Mar. 24, 2022, 4 Pages.

(Continued)

*Primary Examiner* — Zujia Xu
(74) *Attorney, Agent, or Firm* — Invoke

(57) ABSTRACT

Techniques for de-centralized execution of workflows are disclosed. A system executes a sequence of jobs in a workflow. Each job includes application code to perform a defined set of functions. Each job includes wrapper code at one or both ends of the application code. The system executes the sequence of jobs by iteratively spinning up a virtual machine, loading workflow data to be used by application code, executing the application code, and storing modified workflow data. The virtual machine executing one job triggers the next virtual machine to execute the next job in the workflow, without scheduling the next job by a centralized job scheduler. Upon spinning up the next virtual machine, a virtual machine executing a preceding job shuts itself down.

17 Claims, 7 Drawing Sheets

(56) References Cited

U.S. PATENT DOCUMENTS

| | | | | |
|---|---|---|---|---|
| 2010/0100881 | A1* | 4/2010 | Shigeta | G06F 11/2247 718/1 |
| 2012/0060165 | A1 | 3/2012 | Clarke | |
| 2013/0326053 | A1* | 12/2013 | Bauer | G06F 11/20 709/224 |
| 2014/0325521 | A1* | 10/2014 | Li | G06F 9/5038 718/104 |
| 2015/0355938 | A1* | 12/2015 | Jokinen | G06F 9/4881 718/107 |
| 2019/0102279 | A1* | 4/2019 | Awan | G06F 9/4486 |
| 2020/0225972 | A1* | 7/2020 | Karunaratne | G06F 9/45558 |
| 2020/0356376 | A1* | 11/2020 | Lynch | G06F 9/5072 |
| 2021/0211391 | A1* | 7/2021 | Paraschiv | G06F 9/3877 |
| 2021/0326175 | A1* | 10/2021 | Herbert | G06F 9/541 |
| 2022/0342899 | A1* | 10/2022 | Harwood | G06F 9/505 |

OTHER PUBLICATIONS

"Automatic trigger of Generated Jobs created from Jenkins SeedJob", Retrieved from https://souravatta.medium.com/automatic-trigger-of-generated-jobs-created-from-jenkins-seedjob-b517ed88b6f8, May 18, 2021, 11 Pages.

"AWS Data Pipeline", Retrieved from https://aws.amazon.com/datapipeline/, Retrieved on Mar. 24, 2022, 2 Pages.

"Building sequence jobs", Retrieved from https://www.ibm.com/docs/en/iis/11.3?topic=jobs-building-sequence, Jun. 30, 2022, 2 Pages.

"Choose when to run jobs", Retrieved from https://docs.gitlab.com/ee/ci/jobs/job_control.html, Retrieved on Jul. 2022, 1 Page.

"Classic Delivery Pipeline overview", Retrieved from https://cloud.ibm.com/docs/ContinuousDelivery?topic=ContinuousDelivery-deliverypipeline_about, Nov. 15, 2021, 3 Pages.

"Data Pipelines With Apache Airflow", Retrieved from https://medium.com/swlh/data-pipelines-with-apache-airflow-46258deb2844, Retrieved on Jul. 2022, 3 Pages.

"Linking different jobs to create pipelines in Jenkins", Retrieved at https://mohitgoyal.co/2017/02/20/linking-different-jobs-to-create-pipelines-in-jenkins/, Feb. 20, 2017, 4 Pages.

"Pipeline run sequence", Retrieved from https://docs.microsoft.com/en-us/azure/devops/pipelines/process/runs?view=azure-devops, Feb. 11, 2022, 11 Pages.

"Scheduling & Triggers", Retrieved from https://airflow.apache.org/docs/apache-airflow/1.10.1/scheduler.html, Retrieved on Jul. 2022, 3 Pages.

"Specify jobs in your pipeline", https://docs.microsoft.com/en-us/azure/devops/pipelines/process/phases?view=azure-devops&tabs=yaml, Feb. 11, 2022, 16 Pages.

"Using Workflows to Schedule Jobs", Retrieved from https://circleci.com/docs/workflows, Retrieved on Jul. 2022, 4 Pages.

"Using Workspaces to Share Data between Jobs", Retrieved from https://circleci.com/docs/workspaces, Retrieved on Jul. 2022, 4 Pages.

"What is Argo Workflows", Retrieved from https://argoproj.github.io/workflows/, Retrieved on Jul. 2022, 1 Page.

"What is AWS Data Pipeline?", Retrieved from https://docs.aws.amazon.com/datapipeline/latest/DeveloperGuide/what-is-datapipeline.html, Retrieved on Mar. 24, 2022, 2 Pages.

"Who trigger the pipeline job, gitlab server or gitlab-runner?", Retrieved from https://forum.gitlab.com/t/who-trigger-the-pipeline-job-gitlab-server-or-gitlab-runner/48402/2, Retrieved on Jul. 2022, 1 page.

* cited by examiner

DISPLAY
712
INPUT
DEVICE
714
CURSOR
CONTROL
716
MAIN
MEMORY
706
ROM
708
STORAGE
DEVICE
710
BUS
702
PROCESSOR
704
COMMUNICATION
INTERFACE
718
700
NETWORK
LINK
720
728
INTERNET
ISP
726
SERVER
730
LOCAL
NETWORK
722
HOST
724

DE-CENTRALIZED WORKFLOW EXECUTION BASED ON SEQUENTIALLY TRANSFERRING CONTROL OF AN EXECUTION PROCESS AMONG A PLURALITY OF VIRTUAL MACHINES

TECHNICAL FIELD

The present disclosure relates to workflow execution. In particular, the present disclosure relates to de-centralized execution of a sequence of jobs or operations in a workflow.

BACKGROUND

Cloud computing provides entities with access to a shared pool of configurable computing resources, such as networks, servers, storage, applications, and services. The services provided or accessed through the cloud are referred to as cloud services. Generally, cloud computing enables an organization to access functionality as service layers within the cloud environment instead of requiring the organization to create and maintain the functionality internally.

An application running on a cloud environment may be set up to run a sequence of jobs, or a workflow, in a particular order. Each job may define one or more builds. The builds may correspond to executable files, for example. Jobs may define where to find source code files, how and when to run builds, and the software and the environment required to run builds. For example, an application developer may configure application data to run a sequence of jobs to generate a corresponding set of builds. A system executes the set of builds to utilize application functions.

Conventional systems include a centralized workflow scheduler that monitors the progress of each job in a workflow, detects completion of a job, and initiates execution of the next job. The centralized workflow scheduler requires dedicated processing resources throughout the life of the workflow to monitor job progress and initiate new jobs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
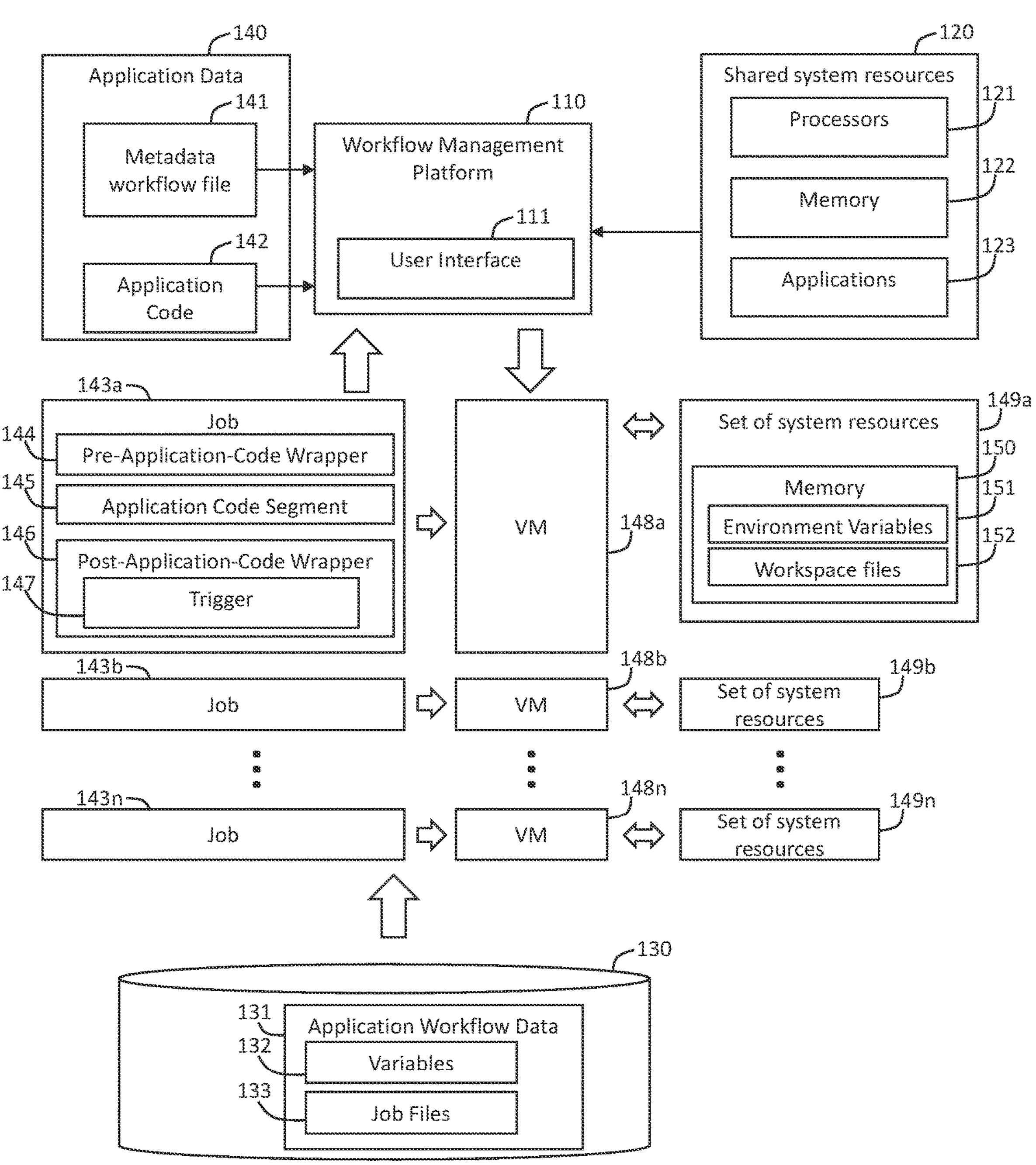
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. DE-CENTRALIZED WORKFLOW EXECUTION
4. EXAMPLE EMBODIMENTS
5. COMPUTER NETWORKS AND CLOUD NETWORKS
6. MISCELLANEOUS; EXTENSIONS
7. HARDWARE OVERVIEW

1. General Overview

A workflow management platform creates workflow code to execute a workflow including a sequence of jobs. Each job in the sequence of job triggers execution of a next job in the sequence, without using a centralized scheduler to schedule initiation of the next job upon detecting completion of the previous job.

One or more embodiments include generating workflow code which, when executed, initiates a sequence of jobs of a workflow. The system generates the workflow code based on application code. The application code may specify sets of operations to create, modify, and/or delete variables, files, data objects, and other data structures. Each set of operations may correspond to a separate job. Each job may generate one or more builds, such as a compiled set of code that is executable to perform particular functions of an application. A system may generate the workflow based on the application code and a metadata file containing workflow data. For example, the metadata file may specify a sequence of jobs, a segment of application data associated with each job, and system resources required to execute a virtual machine that performs each job. The workflow code may include job code for each job in the workflow. The system generates each set of job code by wrapping a segment of application code in wrapper code. The wrapper code specifies a set of operations for loading and storing workflow data and for triggering the next job in the workflow.

One or more embodiments iteratively execute a sequence of jobs in a workflow, without requiring scheduling of the jobs by a centralized scheduler. Different jobs in the workflow may be executed by different virtual machines. Different virtual machines may utilize different sets of system resources. For example, one virtual machine may require a relatively small set of computing resources to run an application to execute a job. As a specific example, the job may be the collection of a large data set from a particular location in data storage. The next job may require a much larger set of system resources to run a different application. For example, the job may run a machine learning model application to apply a particular machine learning model to the data set obtained by the first job. Another job may require yet another set of system resources. For example, the next job may generate a data artifact that generates a comparison of the machine learning model results and a present state of a system. The system may allocate different sets of resources to different virtual machines executing the different jobs. Upon completion of the jobs, the respective virtual machines may terminate themselves and return the system resources to a pool of available system resources.

According to one or more embodiments, upon completion of the application code of the first job, a virtual machine executing the first job requests access to the system resources required to spin up the next virtual machine to perform the second job. The virtual machine may request access from a resource manager. For example, in a cloud environment, a virtual machine may request access to resources from a cloud service provider (CSP). Upon obtaining access to the resources required to execute the next virtual machine to perform the next job, the virtual machine executing the first job spins up the next virtual machine to perform the next job. The virtual machine associated with the first job then terminates itself, returning the resources utilized by the virtual machine to perform the first job to a pool of available system resources. Alternatively, or in addition, the virtual machine, executing the first job, may simply terminate after transmitting an asynchronous message that triggers the initiation of another virtual machine to execute the next job. A virtual machine initiation process may complete the initiation of a new virtual machine based on a message received from a last-executing virtual machine, prior to termination of the last-executing virtual machine.

Likewise, upon completion of the application code of the second job, the virtual machine performing the second job requests access to system resources required to execute the next virtual machine to perform the next sequential job. Upon obtaining access to the resources required to execute the next virtual machine, the virtual machine executing the second job initiates the next virtual machine to perform the next job. The virtual machine associated with the second job then terminates itself, returning the resources utilized by the virtual machine to the pool of available system resources.

One or more embodiments store workflow data generated by each job in a workflow in persistent data storage to be available to each subsequent job in the workflow. The workflow data may include environment variables. Each virtual machine loads workflow variables stored by an immediately-preceding virtual machine executing the immediately-preceding job in the workflow. The workflow data may further include files, data artifacts, and data objects. A virtual machine executing a subsequent job may access any file, data artifact, or data object stored by any preceding virtual machine executing a preceding job in the workflow. For example, one virtual machine may generate a data object to store a particular set of data with a specified data structure. The virtual machine executing the next job may load the data object and modify the data object by merging it with another data object. Yet another virtual machine executing a subsequent job in the workflow may load the initial data object, rather than the modified data object, to populate the data object with data from a specified database. Each virtual machine may load environment variables from the immediately-preceding virtual machine, while selectively loading other workflow data, such as data objects, files, and data artifacts, generated by preceding jobs in the workflow.

One or more embodiments run two or more workflows simultaneously. The workflows may access the same sets of workflow data. For example, one workflow may include a plurality of jobs to apply a machine learning model to a data set to generate predictions. Another workflow, executing in parallel with the first workflow, may include a plurality of jobs to perform functions to detect data drift in the machine learning model. The jobs in the first workflow may trigger subsequent jobs in the first workflow. Likewise, the jobs in the second workflow may trigger subsequent jobs in the second workflow. However, a job in the second workflow may load workflow data, such as a machine learning model prediction, generated by the first workflow. Likewise, a job in the first workflow may load workflow data, such as data drift feedback, generated by the second workflow. A job in the first workflow may include functions to retrain the machine learning model based on the data drift feedback generated by the second workflow.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a workflow management platform 110, shared system resources 120, and a data repository 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the workflow management platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the workflow management platform 110. Alternatively, or additionally, a data repository 130 may be implemented or executed on a computing system separate from the workflow management platform 110. A data repository 130 may be communicatively coupled to the workflow management platform 110 via a direct connection or via a network.

Information describing application workflow data 131 may be implemented across any of components within the system 100. However, this information is illustrated within the data repository 130 for purposes of clarity and explanation.

The workflow management platform 110 may include hardware, including processors, memory, and logic circuits, and software to manage access to shared system resources 120 by one or more clients. For example, the workflow management platform 110 may be part of a cloud services provider that provisions and maintains a cloud environment of servers and data repositories. The shared system resources 120, such as the cloud environment resources, include processors 121, memory 122, and applications 123. For example, nodes in the cloud environment may include servers that comprise processors and memory running particular applications. The workflow management platform 110 may provide one or more clients, or tenants, with access to the same set of shared system resources 120. In one or more embodiments, a tenant is a corporation, organization, enterprise, or other entity that accesses a shared computing resource, such as an application running on shared system hardware resources. In an embodiment, tenants are independent from each other. A business or operation of one tenant may be separate from a business or operation of another tenant.

In one or more embodiments, the workflow management platform 110 includes an application programming interface (API) specifying functions accessible by a client via a user interface 111 to process application data 140, including a metadata workflow file 141 and application code 142, using the shared system resources 120. A user may call functions of the API to run operations specified in the application code 142 in a cloud environment. The API includes functionality to allow a user to specify a sequence of jobs to be performed on the shared system resources 120. Based on a user calling functions of the API, the workflow management platform 110 receives application code 142 specifying a set of operations to be performed using defined variables and files. The metadata workflow file 141 specifies a sequence of separate jobs for executing the application code 142. The metadata workflow file 141 further specifies the resources required to perform the respective jobs. For example, application code 142 may specify operations A, B, C, D, E, and F, modifying variables X and Y, and modifying data file JKL. The metadata workflow file 141 may specify a sequence of jobs Q, R, and S. Job Q may include operations A and B that generate an executable application artifact L. Job R may include operations C and D that generate an executable application artifact M. Job S may include operations E and F that generate an executable application artifact N. The metadata workflow file 141 may further specify particular resources for each job in the workflow sequence. For example, the metadata workflow file 141 may specify a first set of computing resources (such as a particular server having particular applications and/or hardware specifications) to execute Job Q, a second set of nodes—different from the first set of nodes—to execute Job R, and the first set of nodes to execute Job S.

Based on the application code 142 and the metadata workflow file 141, the workflow management platform 110 generates a sequence of jobs 143*a*-143*n* executed by a respective set of virtual machines 148*a*-148*n* using respective sets of system resources 149*a*-149*n*. The system resources 149*a*-149*n* may be specified in the metadata workflow file 141 and may be different from each other.

In one or more embodiments, interface 111 refers to hardware and/or software configured to facilitate communications between a user and the workflow management platform 110. Interface 111 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 111 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 111 is specified in one or more other languages, such as Java, C, or C++.

The workflow management platform 110 generates a particular job in the sequence of jobs 143*a*-143*n* by wrapping a subset of application code 142 with wrapper code. For example, job 143*a* includes pre-application-code wrapper code 144, a segment 145 of application code (being a segment of the application code 142), and post-application code wrapper code 146. Each job 143*a*-143*n* includes both wrapper code and a segment of application code.

The pre-application-code wrapper code 144 includes instructions, executable by a respective virtual machine 148*a*-148*n*, to load application workflow data 131 from a shared dataspace, such as the data repository 130. For example, the set of system resources 149*a* includes processors, memory, and applications. The virtual machine 148*a* loads into memory 150 environment variables 151 and workspace files 152 from the application workflow data 131 stored in the data repository 130.

The post-application-code wrapper-code 146 includes instructions, executable by a respective virtual machine 148*a*-148*n*, to store variables and files created and/or modified by the application code segment 145 as variables 132 and job files 133 in the shared dataspace, such as the data repository 130. For example, the post-application-code wrapper code 146 includes instructions, executed by the virtual machine 148*a*, to store environment variables 151 and workspace files 152 in the repository 130 as application workflow data 131.

The post-application-code wrapper code 146 further includes a trigger 147 to spin up a new virtual machine to execute a next job in the workflow. Specifically, the post-application-code wrapper code 146 includes instructions, executable by a respective virtual machine 148*a*-148*n*, to identify a next job in the workflow. For example, the virtual machine 148*a* executing the post-application-code wrapper code 146 of job 143*a* identifies job 143*b* as the next job in the workflow. Based on the information obtained from the metadata workflow file 141 identifying a set of system resources 149*b* required to execute the next job 143*b*, virtual machine 148*a* requests access to shared system resources 120 necessary to execute the next job 143*b*. The workflow management platform 110 may receive from the virtual machine 148*a* the request for the set of system resources 149*b* necessary to execute the next job 143*b*. Upon receiving from the workflow management platform 110 access to the set of resources 149*b*, the virtual machine 148*a* executes instructions in the post-application-code wrapper-code 146 to spin up the virtual machine 148*b* to begin execution of the job 143*b*. The virtual machine 148*a* then shuts itself down.

According to one or more embodiments, the variables 132 generated and modified by operations in a sequence of jobs are stored as a workflow environment. The pre-application-code wrapper-code of each job includes instructions which, when executed by a virtual machine, load the variables 132 and store the variables as a pre-application-code environment of the job. The post-application-code wrapper-code includes instructions which, when executed by a virtual machine, cause the virtual machine to compare the values of the variables after execution of application code to the pre-application-code environment to generate an environment delta. The system stores the environment delta as variables 132 in the application workflow data 131. The pre-application-code wrapper of the next job in the sequence of jobs in the workflow includes instructions to load the environment delta (i.e., the changed values of the variables 132) prior to executing its application code.

According to one or more embodiments, the virtual machine 148*a* executing the instructions in the post-application-code wrapper code 146 generates the request for the set of system resources 149*b* required to execute the job 143*b*. In other words, the workflow management platform 110 allocates the set of system resources 149*b* for use by the virtual machine 148*b* to execute the job 143*b* responsive to a request from the previous job 143*a*. The workflow management platform 110 may not schedule jobs 143*a*-143*n*. The workflow management platform 110 may refrain from allocating, without receiving a request from a virtual machine executing a presently-executing job, system resources to execute a next job in a workflow.

Additional embodiments and/or examples relating to computer networks are described below in Section 5, titled "Computer Networks and Cloud Networks."

In one or more embodiments, the workflow management platform 110 refers to hardware and/or software configured to perform operations described herein for providing a user interface to define workflow pipelines, provide access to shared system resources 120, and spin up virtual machines using the shared system resources 120. Examples of operations for executing de-centralized workflows are described below with reference to FIG. 2.

3. De-Centralized Workflow Execution

Figure 2:
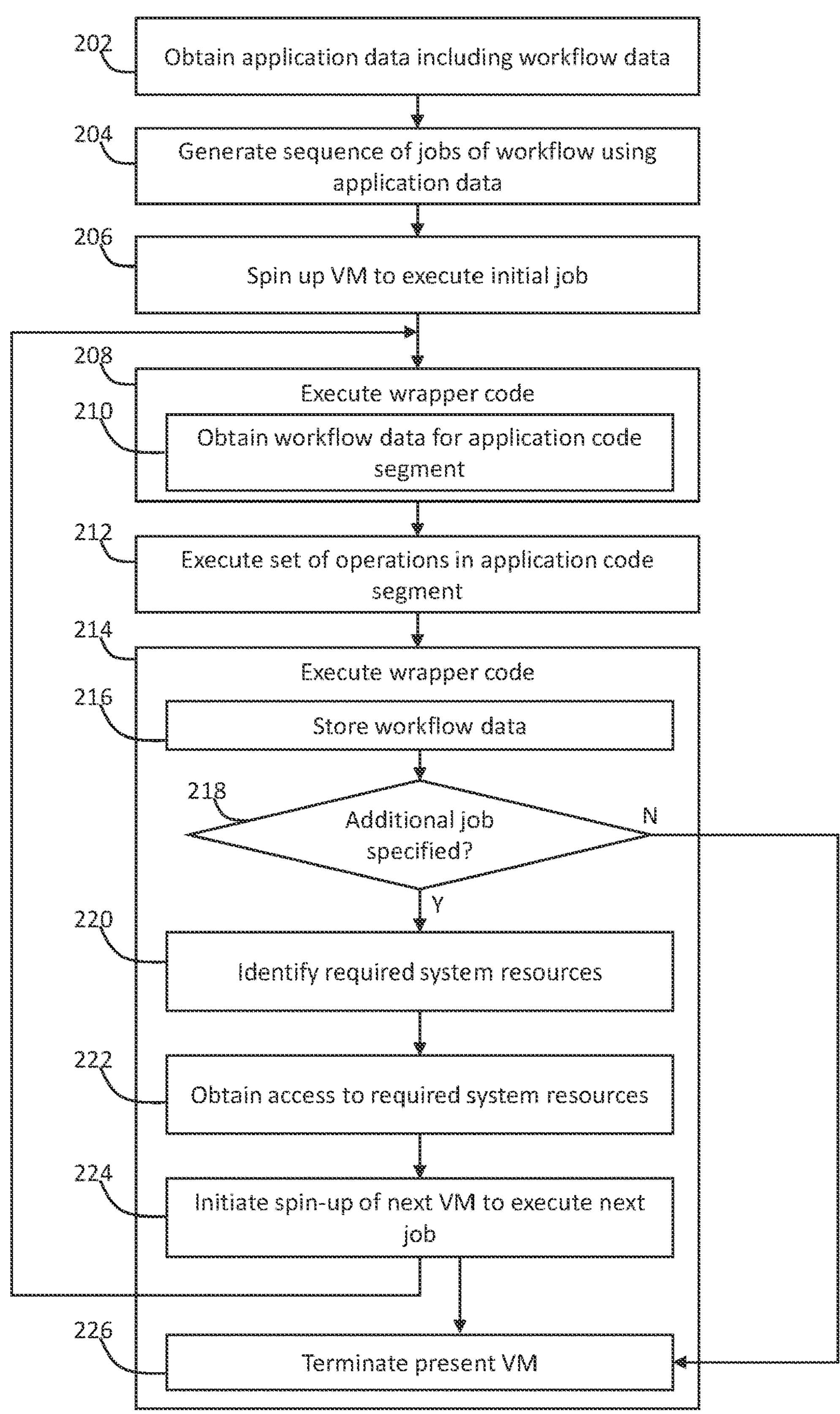
FIG. 2 illustrates an example set of operations for de-centralized workflow execution in accordance with one or more embodiments.

FIG. 2 illustrate an example set of operations for executing de-centralized workflows in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system obtains application data including workflow data specifying a sequence of jobs to be executed in a workflow (Operation 202). For example, the application data may include application code specifying operations to be executed, variables and files to be created, modified, and/or deleted by the operations, and metadata, such as directory data, to be created, modified, and/or deleted by the operations. The application data may further include workflow data specifying a sequence of jobs for executing the operations. The sequence of jobs may be specified in a metadata file. The system may obtain the application code separately from the workflow metadata file.

In one or more embodiments, the metadata file specifies resources required to perform a job. A first job in the workflow may require a first set of shared system resources—including processing resources, such as compute nodes in a cloud environment. A second job in the workflow may require a second set of shared system resources, different from the first set of shared system resources.

According to one or more embodiments, the system obtains the workflow data in response to a user interaction with a user interface. For example, a user may provide application code to a workflow management platform. The workflow management platform may provide the user with a graphical user interface (GUI) to allow the user to create a workflow specification. For example, the user may create a "YAML Ain't Markup Language" (YAML) file, flow diagram, directed acyclic graph (DAG) diagram, or any other file capable of specifying a sequence of jobs.

The system generates a sequence of jobs based on the application data (Operation 204). According to one or more embodiments, the system identifies segments of application code corresponding to a respective sequence of jobs. The system generates wrapper code which specifies a set of operations to perform prior to executing a segment of application code and subsequent to executing the segment of application code. The system applies the wrapper code to each segment of the application code to generate the sequence of jobs.

The wrapper code includes pre-application-code wrapper code to load workflow data to be accessible by a particular segment of application code while executing the application code. The workflow data includes variables, files, and metadata, such as directories. The wrapper code further includes post-application-code to store the workflow data which has been modified based on executing the application code. The post-application-code wrapper code further includes instructions for triggering a next job in the sequence of jobs.

The system spins up an initial virtual machine to execute an initial job in the sequence of jobs in the workflow (Operation 206). The initial virtual machine includes a particular operating platform running on designating computing resources, including processors and memory. According to one embodiment, a workflow is implemented in a cloud environment. The system spins up a virtual machine on a virtual machine server. The virtual machine server may support a plurality of separate virtual machines. The virtual machine server assigns to each separate virtual machine a separate set of processors and memory to run applications, execute operations, and store data. While a virtual machine is running, the server may prevent one virtual machine from accessing processors and memory assigned to another virtual machine. In addition, one virtual machine running on the server may execute software different from another virtual machine running on the server.

The virtual machine executes the pre-application-code wrapper code for a particular job in the sequence of jobs (Operation 208). When the virtual machine is the initial virtual machine executing an initial pre-application-code-wrapper of a first sequential job in the sequence of jobs, the initial pre-application-code wrapper code may load an empty set of workflow variables and workspace files. Alternatively, the initial pre-application-code wrapper code may initialize one or more workflow variables by assigning initial values to the workflow variables. Similarly, the initial pre-application-code wrapper code may load one or more previously-stored workspace files from a designated location in memory.

For each job subsequent to the first initial job, a respective virtual machine executes pre-application-code wrapper code to obtain workflow data for a respective job (Operation 210).

In particular, a respective virtual machine: (a) loads any environment variables defined by the workflow, (b) loads an environment delta generated by a previous job in the sequence of jobs, (c) loads environment variables defined specifically for the job, (d) saves a snapshot of the present state of environment variables, (e) loads workspace files, and (f) sets up a working directory.

The virtual machine loads environment variables, which could be tags, labels, or designations assigned by application code of any previously-executed job in the sequence of jobs to data objects or other resources associated with the workflow. The virtual machine identifies the environment variables associated with the workflow and takes snapshots of the environment variables before and after executing the application code. The virtual machine identifies and loads the environment delta generated by a previous job. The environment delta identifies a difference between (a) a snapshot of the environment variables at a start of the previous job and (b) a snapshot of the environment variables subsequent to executing the application code of the previous job. The workspace files include any files generated by previously-executed jobs or loaded by previously-executed jobs to a workspace folder accessible by each job in the sequence of jobs. The working directory includes metadata that organizes files and other workflow data.

Subsequent to executing the pre-application-code wrapper, the virtual machine executes operations specified in a segment of application code associated with a particular job in the sequence of jobs (Operation 212). The application code segment may create, modify, and/or delete one or both of environment variables and local variables. Environment variables are stored in a workspace environment and are available to any subsequently-executed job in the sequence of jobs. Local variables may be used only within a particular segment of application code, without being stored in the workspace environment for use by any other job in the sequence of jobs. According to one or more embodiments, both the environment variables and the local variables may be stored in the same workspace environment. A system may not distinguish between environment variables that are passed to subsequent jobs and local variables that are generated and modified only within a job. Instead, the system may store any generated variables in the workspace environment and pass any variables to a job based on the application code of the job modifying the variable. The application code segment may create, modify, and/or delete files and other data objects. The application code segment may generate one or more artifacts. An artifact may be a file or data structure that may be executed by software. For example, a workflow may correspond to an executable application for performing a particular function. One job in the workflow may generate one compiled and validated software artifact. A user may execute the software artifact to perform a function of the application, such as generating a particular web-based user interface. Another job in the workflow may generate another software artifact. A user may execute the software artifact to perform another function of the application. According to another example, an artifact may be a non-executable data object.

Subsequent to executing the application code, the virtual machine executes post-application-code wrapper code (Operation 214). Executing the post-application-code wrapper code includes storing workflow data (Operation 216) and triggering any subsequent jobs. In particular, executing the post-application-code wrapper code may include: (a) storing a snapshot of environment variables, (b) generating an environment delta representing a difference between the environment variables prior to executing the application code and subsequent to executing the application code, (c) saving workspace files to workspace memory, storing any generated artifacts or other output data objects, and (d) triggering any subsequent jobs.

The virtual machine triggers any subsequent jobs by determining whether an additional job is specified in the metadata workflow file (141) (Operation 218). According to one embodiment, the wrapper code reads the metadata workflow file at runtime to dynamically determine a subsequent job. For example, the system may generate wrapper code based on the workflow metadata file such that each wrapper code identifies a next job in the job sequence.

If the metadata workflow file specifies a next job in the job sequence, the virtual machine identifies a set of system resources required to execute a virtual machine to perform the next job in the workflow (Operation 220). For example, the present virtual machine may require four processing units, a first application, and a first memory space to execute the present job. The virtual machine may determine that the next virtual machine requires sixteen processing units, the first application and a second application, and a second memory space larger than the first memory space to perform the next job. The system resources may include processing resources, memory resources, other hardware resources, and software resources.

The virtual machine obtains access to the required system resources (Operation 222). For example, the virtual machine may generate a request to a management platform requesting access to the required system resources. The management platform may assign particular system resources from among the shared system resources to the workflow. According to one or more embodiments, the virtual machine initiates the request to the management platform responsive to executing the wrapper code. Accordingly, the management platform does not initiate assignment of system resources or spinning up of virtual machines for executing jobs in a workflow independently of the request from the present virtual machine. In addition, the management platform may not schedule jobs in the workflow. Instead, each job in the workflow includes wrapper code which, when executed by a virtual machine, triggers the next job in the workflow.

Based on receiving access to the required system resources, the present virtual machine initiates a spin-up of the next virtual machine for executing the next job in the sequence of jobs (Operation 224). For example, present virtual machine may initiate software on the set of system resources allotted to the next virtual machine to spin up the next virtual machine.

The next virtual machine executes pre-application-code wrapper code (Operation 208), executes an application code segment (Operation 212), and executes post-application-code wrapper code (Operation 214) to trigger the next job in the sequence of jobs.

Upon spinning up of the next virtual machine (Operation 224), the present virtual machine terminates itself (Operation 226). A system management platform may re-allocate any system resources allocated to the present virtual machine to a pool of shared system resources available to be allocated to new processes performed by other tenants.

The system iteratively performs operations 208-226 until no additional job is specified at Operation 218, at which point the workflow is completed. Any artifacts generated by one or more jobs of the workflow may be accessed by appropriate software programs. Any environment data used to perform the jobs in the workflow may be deleted or written over.

4. Example Embodiments

Detailed examples are described below for purposes of clarity. Components and/or operations described below should be understood as one specific example which may not be applicable to certain embodiments. Accordingly, components and/or operations described below should not be construed as limiting the scope of any of the claims.

Figure 3:
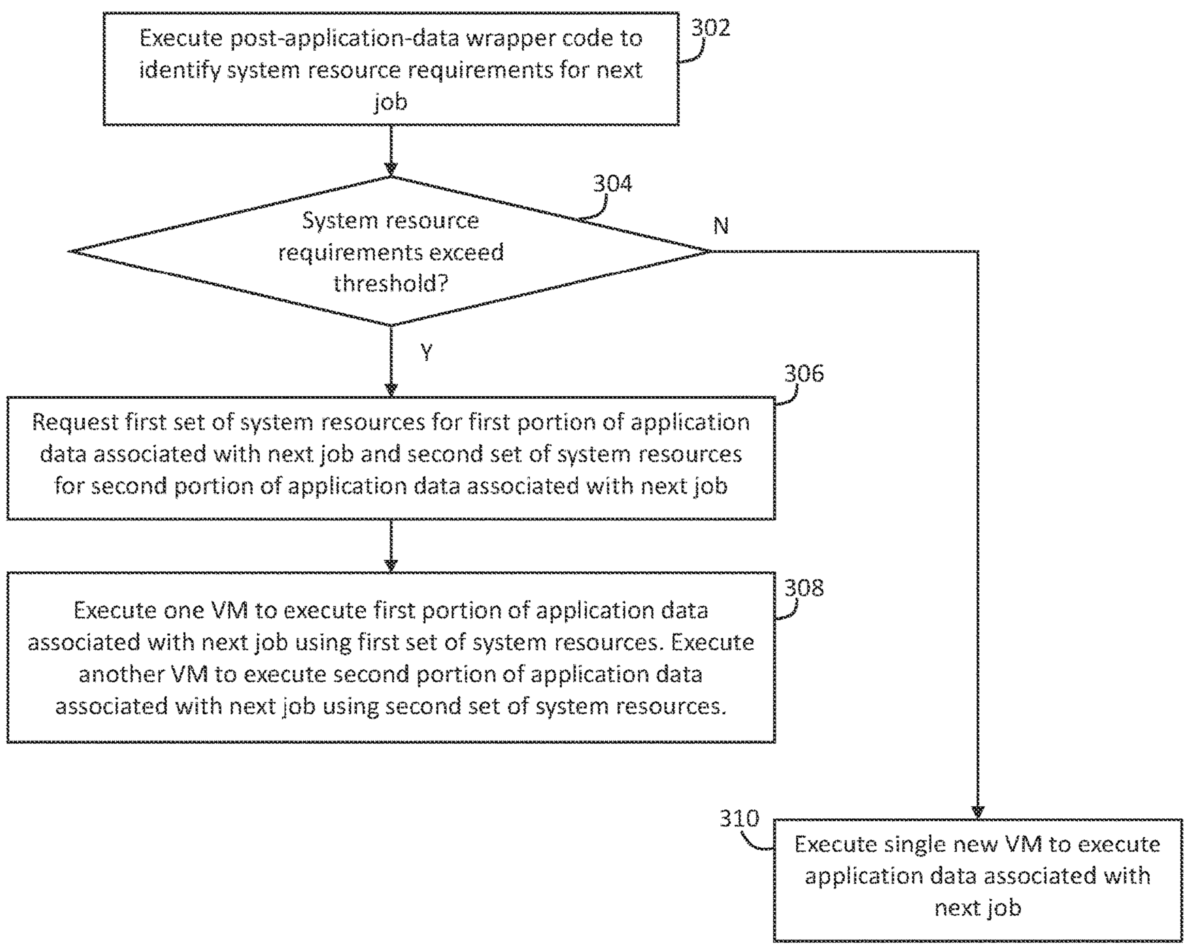
FIG. 3 illustrates an example embodiment for spinning up multiple virtual machines to perform a job in a workflow.

FIG. 3 illustrates an example embodiment of a set of operations for spinning up multiple virtual machines to perform a job in a workflow.

Upon executing a segment of application code, the system executes post-application code wrapper to identify system resource requirements for a next job in a workflow (Operation 302). For example, the resource requirements may include processing requirements—such as processors, processing threads, compute nodes, bandwidth requirements, and throughput requirements. The resource requirements may also include memory capacity requirements, memory type requirements. The resource requirements may also include application requirements, such as access to software programs capable of performing particular functions.

The system compares the system resource requirements to a threshold (Operation 304). According to one embodiment, the threshold is associated with particular performance specifications. For example, the system may be configured to be capable of running four processing units per virtual machine. The threshold may be set at five processing units. According to another example, the resource requirements may include two applications that cannot be run simultaneously on the same machine. The threshold may specify the particular application, such that the threshold is met when the resource requirements include two or more applications, and the two or more applications includes the particular application. If the system resource requirements do not meet the threshold, the system spins up a single virtual machine to execute the next job (Operation 310).

If the system resource requirements meet the threshold, the system initiates a process to spin up multiple virtual machines to execute the next job (Operation 306). The system requests a first set of resources for a first portion of the application data associated with the next job. The system requests a second set of resources for a second portion of the application data associated with the next job. The system divides the set of required system resources into two or more sets of system resources. Each set of system resources may be assigned so as to not exceed the threshold. For example, if each virtual machine in the system may have four processing units, and if a particular job required ten processing units, the system may request three sets of system resources corresponding to four processing units, four processing units, and two processing units, respectively. If a particular job requires two applications that cannot be executed on the same machine, the system may request hardware resources to run one application on one virtual machine and hardware resources to run the other application on another virtual machine.

The system executes a first virtual machine to execute the first portion of the application data. They system executes a second virtual machine to execute the second portion of the application data (Operation 308). The first and second virtual machines may operate on their respective hardware resources independently of each other and simultaneously with each other. The first and second virtual machines may generate output data, such as artifacts, independently of each other. The first and second virtual machines may share workflow data. For example, the first virtual machine may perform a set of operations using a first software application to modify an environment variable. The first virtual machine may store the modified environment variable in a shared workspace. The shared workspace may be associated with a particular virtual memory location. The first virtual machine may communicate with the second virtual machine to indicate that a particular operation has been completed. Based on the communication, a second application running on the second virtual machine may access the modified environment variable in the shared workspace.

Figure 4:
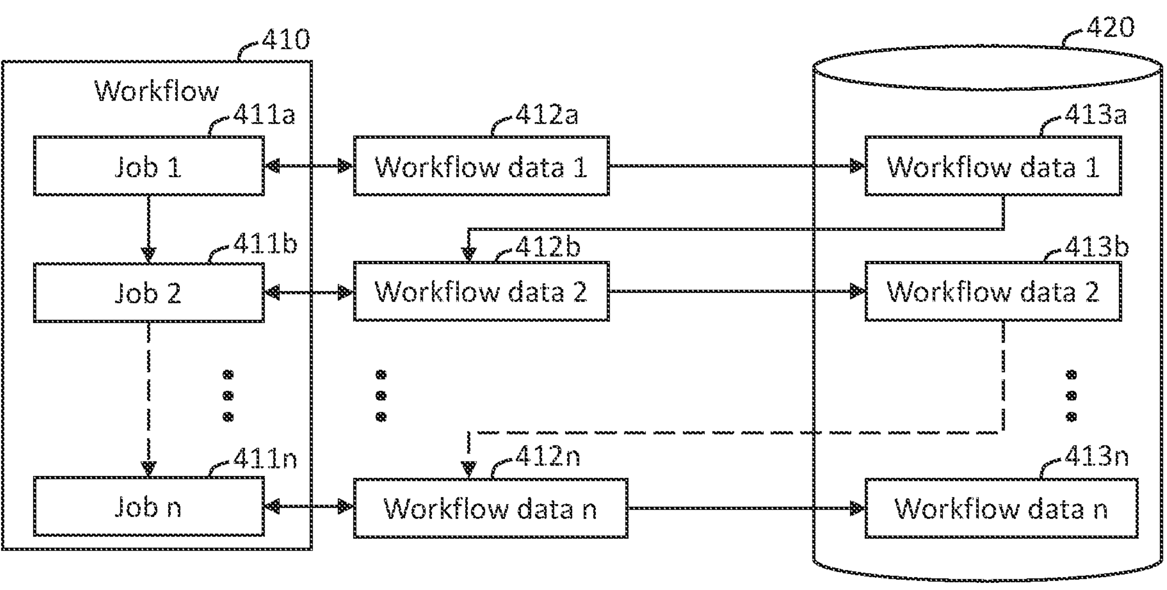
FIG. 4 illustrates an example embodiment for storing workflow data.

FIG. 4 illustrates an example embodiment of storing workflow data for a sequence of jobs. The workflow data is a set of data designated to be used by operations of jobs in the workflow 410. As illustrated in FIG. 4, a workflow 410 includes a sequence of jobs 411*a*-411*n*. Each job in the workflow 410 triggers execution of the next job. During operation, each job accesses, modifies, and creates workflow data. Job 1 411*a* accesses, modifies, and/or creates workflow data 1 412*a*. Upon completion of application code in the job 411*a*, job 1 411*a* stores the workflow data 412*a* in a persistent data repository 420 as workflow data 1 413*a*. The workflow data 1 412*a* that is accessed and modified by job 1 411*a* may be deleted and/or over-written upon completion of job 1 411*a* and spinning down of the virtual machine executing job 1 411*a*.

Job 2 411*b* loads the workflow data 413*a* stored in persistent memory as workflow data 412*b*. Job 2 411*b* accesses and modifies attributes, such as variable values, in the workflow data 2 412*b*. Upon completion of application code in the job 411*b*, job 2 411*b* stores the workflow data 412*b* in the persistent data repository 420 as workflow data 2 413*b*. The workflow data 2 412*b* that is accessed and modified by job 2 411*b* may be deleted and/or over-written upon completion of job 2 411*b* and spinning down of the virtual machine executing job 2 411*b*.

Each subsequent job (e.g., "job n 411*n*") loads the workflow data stored in the data repository 420 from one or more previously-executed jobs to operate as workflow data 412*n*. Each job stores the modified workflow data in the data repository as a new set of workflow data. The final job in the workflow 410 stores a final set of workflow data 413*n*.

Job 1 generates a workspace 1, including workflow data. Workspace 1 is generated and stored in local memory accessed by job 1. Workspace 1 is stored in persistent memory. Job 2 loads workspace 1 into local memory accessible by job 2. For example, each job has access to separate local resources including separate memory and separate processing units. Each job loads the workspace into the local memory upon initiation, stores to persistent memory upon completion. Workspace include workspace data generated by previous jobs. Includes delta snapshots from previous jobs.

According to one or more embodiments, a user generates application code that may be executed on multiple different virtual machines while accessing workflow data across all the jobs in the workflow 410. For example, while job 1 411*a* may be executed by one virtual machine on one set of system resources, and job 2 411*b* may be executed by another virtual machine on another set of system resources, a user may define an environment variable in application code stored in workflow data 1 412*a* and call the same environment variable in application code in job 2 411*b* without having to re-define the environment variable. The wrapper code of job 2 411*b* loads the workflow data 1 413*a* from the previously-executed job 1 411*a* as workflow data 2 412*b* accessible by the subsequent job 2 411*b*.

Figure 5:
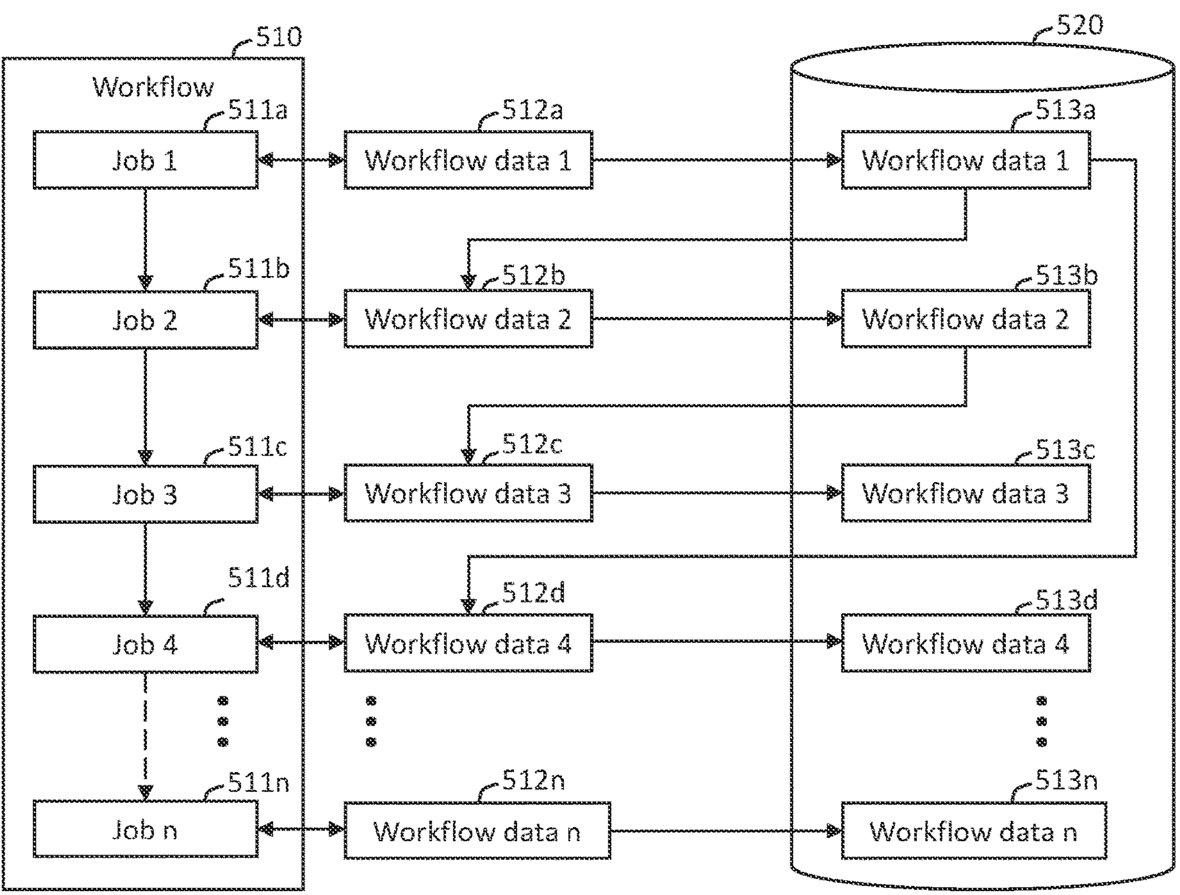
FIG. 5 illustrates an example embodiment for accessing, by subsequent jobs in a workflow, workflow data generate by previous jobs in the workflow.

FIG. 5 illustrates an example embodiment for storing workflow data that is accessible to subsequent jobs. The workflow data includes data objects, data artifacts, and data files. For example, a data artifact may be a set of compiled code that is executable by a software application to perform a defined set of operations.

As illustrated in FIG. 5, a workflow 510 includes a sequence of jobs 511*a*-511*n*. Each job in the workflow 510 triggers execution of the next job. Each job operates on a particular set of operating workflow data 512*a*-512*n* and stores the resulting workflow data 513*a*-513*n* in persistent data storage 520. Each job 511*b*-511*n* subsequent to the initial job 511*a* may load workflow data 513*a*-513*n*-1 from one or more previously-executed jobs to use as operating workflow data 512*b*-512*n*. According to one or more embodiments, operating workflow data 512*a*-512*n* is maintained only during the lifetime of a corresponding job 511*a*-511*n*. A system may assign a particular memory space for the operating data 512*a*-512*a* while the respective jobs 511*a*-511*n* are executing. The system may de-assign the memory space upon termination of a respective job 511*a*-511*n*. For example, the system may assign a memory space to store workflow data 1 512*a* while job 1 511*a* is executing. Upon termination of job 1 511*a*, the system may de-assign the memory space, previously assigned to workflow data 1 512*a*. The system may re-assign the same memory space, or a portion of the same memory space, for use by any subsequent job 511*b*-511*n*, or any other application. In contrast, the workflow data 513*a*-513*n* may be maintained in persistent data storage 520 for the duration of the workflow 510, or even after completion of the workflow 510. For example, the workflow data 513*a*-513*n* may comprise a set of data artifacts including compiled code for executing specified functions in an application. Upon completion of the workflow 510, a user may de-compress the data artifacts and execute the decompressed files associated with the data artifacts.

In the example illustrated in FIG. 5, Job 1 511*a* creates workflow data 1 512*a*. Upon completion of application code in the job 511*a*, job 1 511*a* stores the workflow data 512*a* in a persistent data repository 520 as workflow data 1 513*a*. The persistent data repository 520 may include particular virtual data storage partitions and registries. For example, the persistent data repository 520 may include an artifact registry, a data object storage system, and a file storage system.

The system initiates job 2 511*b* upon completion of job 1 511*a*. Job 2 511*b* loads the workflow data 1 513*a* as operating workflow data 2 512*b*. Job 2 511*b* modifies the operating workflow data 2 512*b* and stores the operating workflow data 2 512*b* as workflow data 2 513*b* in the repository 520.

The system initiates job 3 511*c* upon completion of job 2 511*b*. Job 3 511*c* loads the workflow data 2 513*b* as operating workflow data 3 512*c*. Job 3 511*c* modifies the operating workflow data 3 512*c* and stores the operating workflow data 3 512*c* as workflow data 3 513*c* in the repository 520.

The system initiates job 4 511*d* upon completion of job 3 511*c*. Job 4 511*d* does not load the workflow data 3 513*c* generated by job 3 511*c*. Instead, job 4 511*d* loads workflow data 1 513*c* generated by job 1 511*a* as operating workflow data 512*d*. In other words, any subsequent job in the workflow 510 may select any previously-generated workflow data to access and use as operating workflow data for the present job. A presently-executing job may select workflow data from one or more previously-executed jobs as operating workflow data for the presently-executing job. A presently-executing job select workflow data that does not correspond to a job executed immediately preceding the present job.

According to one embodiment, one type of workflow data is passed from each prior job to each subsequent job, while another type of workflow data may be selectively passed only to particular jobs in the workflow. For example, environment variables may pass from each prior job to each subsequent job in the workflow, as illustrated in FIG. 4. However, data files, data artifacts, and data objects may be loaded and modified only by the subsequent jobs that request the data files, data artifacts, and data objects. In addition, when a presently-executing job modifies an instance of a stored data object, the system may store both the original, unmodified data object as well as the modified data object. Subsequent jobs may load one or both of the original data object and the modified data object as operating workflow data. For example, Job 1 511*a* may create a data object 1. Job 2 511*b* may load the data object 1 and modify the data object 1 to create data object 2. Job 2 511*b* may store the data object 2 in the persistent memory 520. Job 3 511*c* may not load data object 1 or data object 2. Job 4 511*d* may load data object 1 from data object storage in the repository 520 and data object 2 from the data object storage.

Figure 6:
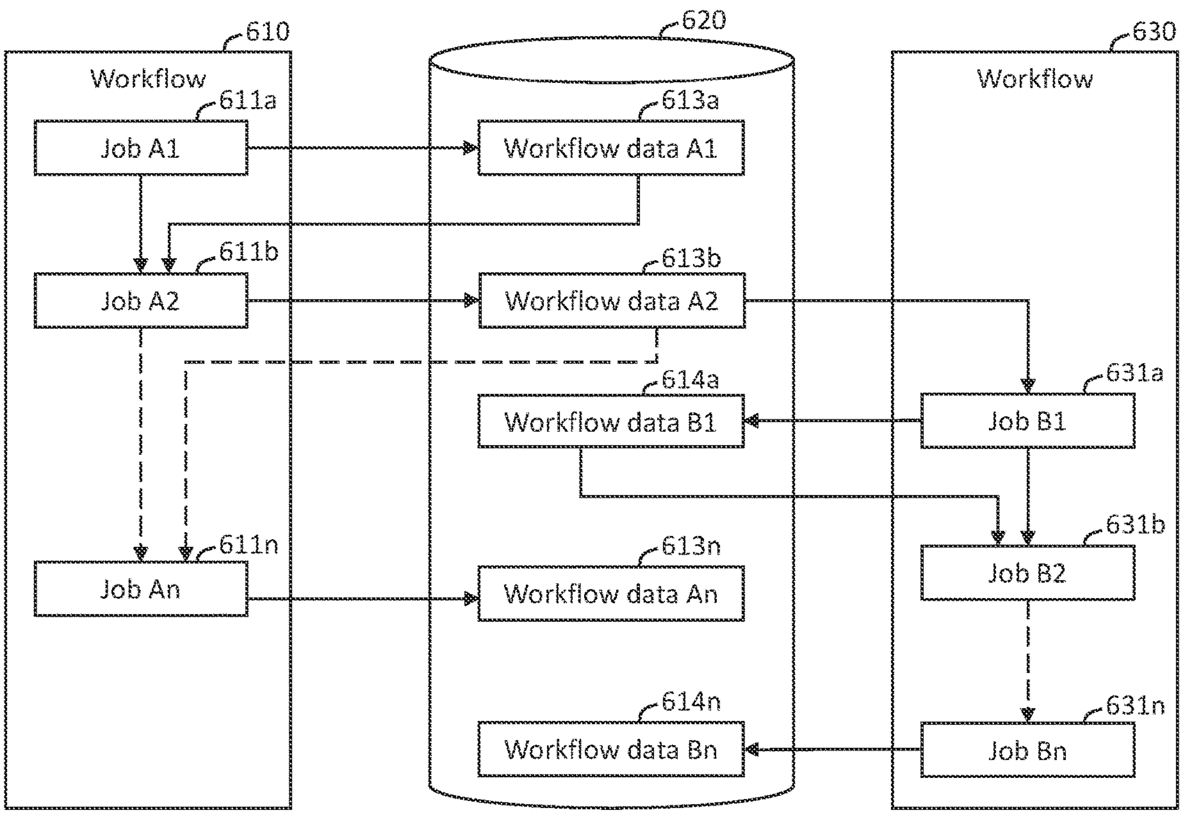
FIG. 6 illustrates an example embodiment for multiple workflows accessing the same sets of workflow data.

FIG. 6 illustrates an example embodiment for executing two workflows simultaneously to access the same data. According to one or more embodiments, a system may execute multiple workflows simultaneously. Separate, independently-executing workflows may access the same sets of workflow data stored in a data repository.

FIG. 6 illustrates workflows 610 and 630 and a data repository 620. Workflow 610 includes a sequence of jobs 611*a*-611*n*. Each job in the workflow 610 triggers execution of the next job. Each job operates on a particular set of operating workflow data and stores the resulting workflow data 613*a*-613*n* in persistent data storage 620. Workflow 630 includes a sequence of jobs 631*a*-631*n*. Each job in the workflow 630 triggers execution of the next job. Each job operates on a particular set of operating workflow data and stores the resulting workflow data 614*a*-614*n* in persistent data storage 620.

Each job 611*a*-611*n* and 631*a*-631*n*, subsequent to an initial job 611*a* may load workflow data 613*a*-613*n*, or 614*a*-614*n*-1 from one or more previously-executed jobs to use as operating workflow data.

In the example illustrated in FIG. 6, Job A1 611*a* stores workflow data A1 613*a* in the data repository 620.

The system initiates job A2 611*b* upon completion of job A1 611*a*. Job A2 611*b* loads the workflow data A1 613*a* as operating workflow data. Job A2 611*b* modifies the operating workflow data and stores the operating workflow data as workflow data A2 613*b* in the repository 620.

The system initiates job B1 631*a* in a concurrently-executing workflow 630. Since job B1 631*a* is in a separate workflow from job A2 611*b*, job B1 631*a* may be initiated independently of the termination of job A2 611*b*.

For example, according to one embodiment, workflow 610 represents operation of a machine learning model engine that applies a machine learning algorithm to one or more training data sets to generate machine learning models as artifacts that are stored in the repository 620. In other words, workflow data 613*a*-613*n* may represent data structures of trained machine learning models. Workflow 630 may represent a data drift analysis engine. Over time, a machine learning model may begin to lose predictive power based on differences between a data set used to train the model and data points to which the model is applied to generate predictions. The drift analysis engine obtains a trained machine learning model generated by the workflow 610 and analyzes the model for data drift. The drift analysis engine generates drift analysis results as feedback that is stored in the repository 620. The machine learning model engine may access the feedback generated by the drift analysis engine to re-train the machine learning model and generate a new trained machine learning model as a set of workflow data.

Returning to FIG. 6, job B1 631*a* loads workflow data A2 613*b*, from workflow 610, to generate working workflow data. Upon executing application data associated with Job B1 631*a*, Job B1 631*a* stores workflow data B1 614*a*. The system initiates job B2 631*b* responsive to determining job B1 631*a* is complete. Job B2 631*b* loads workflow data B1 614*a* as operating workflow data.

Workflow 610 continues sequentially executing jobs until job An 611*n* is complete. The jobs A1 611*a* to An 611*n* may load, as operating workflow data, the workflow data from any previously-completed job (e.g., workflow data 613*a*-613*n*-1 or workflow data 614*a*-614*n*-1). Likewise, workflow 630 continues sequentially executing jobs until job Bn 631*n* is complete. The jobs B1 631*a* to Bn 631*n* may load, as operating workflow data, the workflow data from any previously-completed job (e.g., workflow data 613*a*-613*n* or workflow data 614*a*-614*n*-1).

5. Computer Networks and Cloud Networks

In one or more embodiments, a workflow management platform facilitating de-centralized execution of jobs in a workflow is implemented in a computer network. The computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
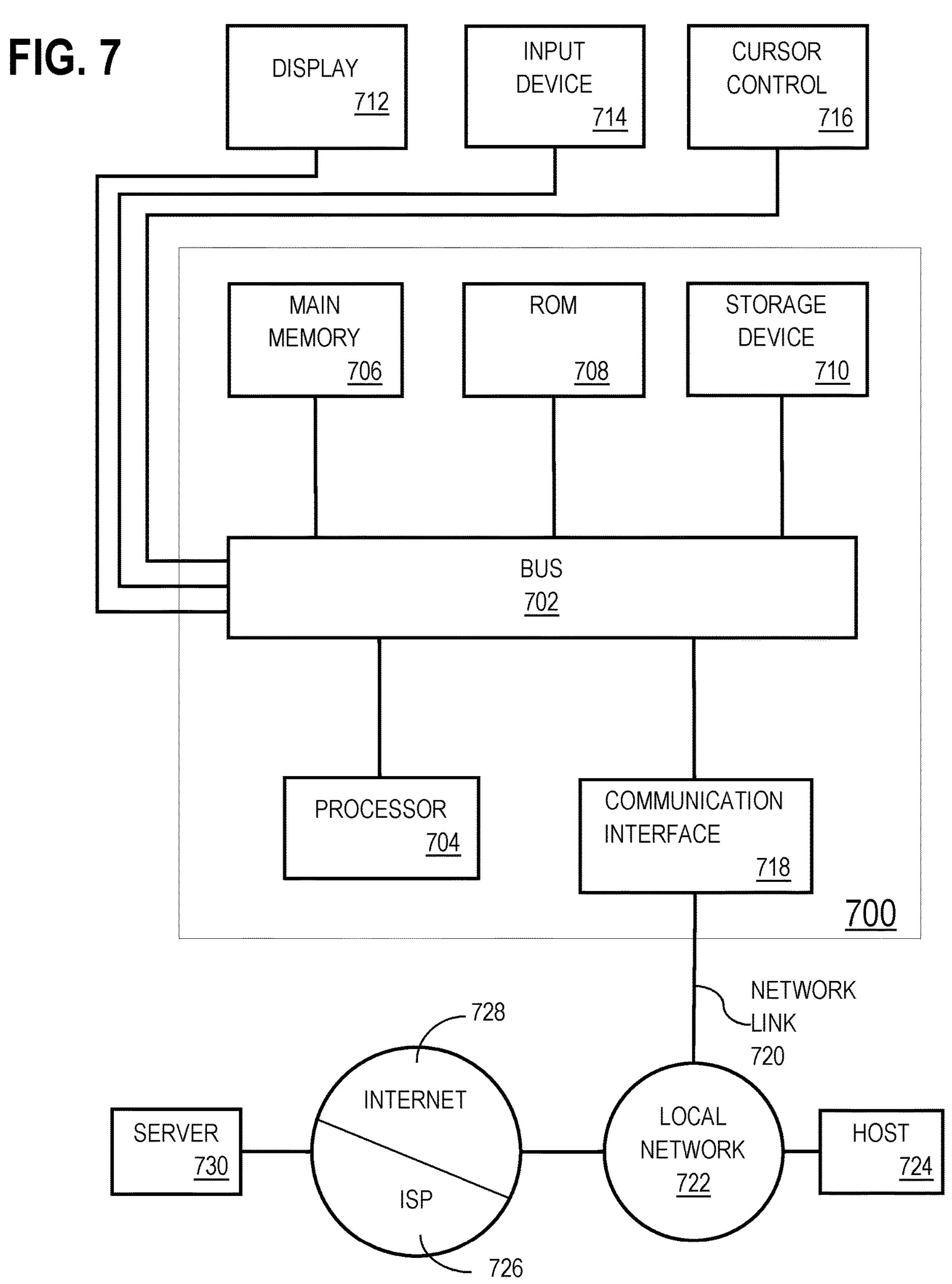
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
- iteratively executing a plurality of jobs by sequentially transferring control of an execution process among a plurality of virtual machines that respectively and sequentially execute the plurality of jobs at least by:
- executing, by a first virtual machine corresponding to a first set of computing resources, application code of a first job of the plurality of jobs;
- responsive to completing execution of the application code of the first job, executing, by the first virtual machine, post-application-code wrapper code attached to the application code to determine a second job of the plurality of jobs to be executed subsequent to the first job and a second set of computing resources for executing the second job by a second virtual machine, wherein the second virtual machine executes at least a portion of the second job with the second set of computing resources after the first virtual machine self-terminates;
- transferring control of the execution process from the first virtual machine to the second virtual machine at least by:
  - initiating, by the first virtual machine, execution of the second virtual machine to execute the second job at least by:
    - requesting, by the first virtual machine from a resource manager, access to the second set of computing resources for the second virtual machine; and
    - initiating execution of the second virtual machine with access to the second set of computing resources for executing the second job; and
  - subsequent to initiating execution of the second virtual machine, self-terminating the first virtual machine at least by returning the first set of computing resources to a pool of available computing resources.

2. The non-transitory computer readable medium of claim 1, wherein iteratively executing the plurality of jobs by the plurality of virtual machines further comprises:
- executing, by the second virtual machine, application code of the second job of the plurality of jobs;
- subsequent to executing, by the second virtual machine, the application code of the second job:
  - determining, by the second virtual machine, a third job, of the plurality of jobs, to be executed subsequent to the second job based on an ordered sequence of the plurality of jobs specified in a metadata file; and
  - initiating, by the second virtual machine, execution of a third virtual machine to execute the third job; and
- subsequent to initiating execution of the third virtual machine, self-terminating the second virtual machine.

3. The non-transitory computer readable medium of claim 1, wherein iteratively executing the plurality of jobs by the plurality of virtual machines further comprises:
- executing, by the second virtual machine, application code of the second job of the plurality of jobs;
- subsequent to executing, by the second virtual machine, the application code of the second job:
  - determining that no additional jobs are to be executed subsequent to the second job based on an ordered sequence of the plurality of jobs in a metadata file; and
  - self-terminating the second virtual machine without executing any additional virtual machines.

4. The non-transitory computer readable medium of claim 1, wherein the operations further comprise:
- obtaining application code corresponding to a plurality of sets of operations associated with the plurality of jobs;
- obtaining a metadata file comprising an ordered sequence of the plurality of jobs; and
- generating job code corresponding to the plurality of jobs at least by attaching pre-application-code wrapper code and post-application-code wrapper code to a plurality of segments of the application code corresponding, respectively, to the plurality of jobs,
- wherein the pre-application-code wrapper code specifies a location of stored workflow data to be used by the plurality of jobs, and
- wherein the post-application-code wrapper code specifies the second job in the ordered sequence of the plurality of jobs.

5. The non-transitory computer readable medium of claim 1, wherein iteratively executing the plurality of jobs comprises:
- prior to executing the application code of the first job, executing pre-application-code wrapper code,
- wherein executing the pre-application-code wrapper code comprises obtaining workflow data from a shared storage shared by each of the plurality of jobs;
- executing the application code of the first job using the workflow data; and
- subsequent to executing the application code of the first job, executing the post-application-code wrapper code,
- wherein executing the post-application-code wrapper code includes storing, in the shared storage, modified workflow data, based on modifying the workflow data by executing the application code of the first job.

6. The non-transitory computer readable medium of claim 1, wherein initiating, by the first virtual machine, execution of the second virtual machine to execute the second job comprises:
- identifying resource requirements associated with the second job based on metadata in a metadata file;
- determining that the resource requirements exceed a threshold value;
- responsive to determining that the resource requirements exceed the threshold value:
  - requesting, from the resource manager, the second set of computing resources corresponding to a first portion of the resource requirements; and
  - requesting, from the resource manager, a third set of computing resources corresponding to a second portion of the resource requirements,
  - wherein a sum of the second set of computing resources and the third set of computing resources is at least equal to the resource requirements associated with the second job; and responsive to receiving access to the second set of computing resources and the third set of computing resources:

initiating execution of the second virtual machine; and initiating execution of a third virtual machine.

7. The non-transitory computer readable medium of claim 6, wherein execution of a first portion of the second job by the second virtual machine is performed simultaneously with execution of a second portion of the second job by the third virtual machine.

8. The non-transitory computer readable medium of claim 1, wherein a first type of a first system resource used by the first virtual machine is different from a second type of a second system resource used by the second virtual machine.

9. The non-transitory computer readable medium of claim 1, wherein the operations further comprise:

determining, by the first virtual machine, resource requirements for the second job; and requesting, by the first virtual machine, allocation of a resource for the second job based on the resource requirements.

10. The non-transitory computer readable medium of claim 1, wherein iteratively executing the plurality of jobs by the plurality of virtual machines comprises:

executing, by the first virtual machine, a first portion of a first set of job code to obtain the application code of the first job; and executing, by the first virtual machine, the application code of the first job to generate first workflow data of the first job.

11. A method comprising:

iteratively executing a plurality of jobs by sequentially transferring control of an execution process among a plurality of virtual machines that respectively and sequentially execute the plurality of jobs at least by:

executing, by a first virtual machine corresponding to a first set of computing resources, application code of a first job of the plurality of jobs;

responsive to completing execution of the application code of the first job, executing, by the first virtual machine, post-application-code wrapper code attached to the application code to determine a second job of the plurality of jobs to be executed subsequent to the first job and a second set of computing resources for executing the second job by a second virtual machine, wherein the second virtual machine executes at least a portion of the second job with the second set of computing resources after the first virtual machine self-terminates;

transferring control of the execution process from the first virtual machine to the second virtual machine at least by:

initiating, by the first virtual machine, execution of the second virtual machine to execute the second job at least by:

requesting, by the first virtual machine from a resource manager, access to the second set of computing resources for the second virtual machine; and initiating execution of the second virtual machine with access to the second set of computing resources for executing the second job; and subsequent to initiating execution of the second virtual machine, self-terminating the first virtual machine at least by returning the first set of computing resources to a pool of available computing resources.

12. The method of claim 11, wherein iteratively executing the plurality of jobs by the plurality of virtual machines further comprises:

executing, by the second virtual machine, application code of the second job of the plurality of jobs;

subsequent to executing, by the second virtual machine, the application code of the second job:

determining, by the second virtual machine, a third job, of the plurality of jobs, to be executed subsequent to the second job based on an ordered sequence of the plurality of jobs specified in a metadata file; and initiating, by the second virtual machine, execution of a third virtual machine to execute the third job; and subsequent to initiating execution of the third virtual machine, self-terminating the second virtual machine.

13. The method of claim 11, wherein iteratively executing the plurality of jobs by the plurality of virtual machines further comprises:

executing, by the second virtual machine, application code of the second job of the plurality of jobs;

subsequent to executing, by the second virtual machine, the application code of the second job:

determining that no additional jobs are to be executed subsequent to the second job based on an ordered sequence of the plurality of jobs in a metadata file; and self-terminating the second virtual machine without executing any additional virtual machines.

14. The method of claim 11, further comprising:

obtaining application code corresponding to a plurality of sets of operations associated with the plurality of jobs;

obtaining a metadata file comprising an ordered sequence of the plurality of jobs; and generating job code corresponding to the plurality of jobs at least by attaching pre-application-code wrapper code and post-application-code wrapper code to a plurality of segments of the application code corresponding, respectively, to the plurality of jobs, wherein the pre-application-code wrapper code specifies a location of stored workflow data to be used by the plurality of jobs, and wherein the post-application-code wrapper code specifies the second job in the ordered sequence of the plurality of jobs.

15. The method of claim 11, wherein iteratively executing the plurality of jobs comprises:

prior to executing the application code of the first job, executing pre-application-code wrapper code, wherein executing the pre-application-code wrapper code comprises obtaining workflow data from a shared storage shared by each of the plurality of jobs;

executing the application code of the first job using the workflow data; and subsequent to executing the application code of the first job, executing the post-application-code wrapper code, wherein executing the post-application-code wrapper code includes storing, in the shared storage, modified workflow data, based on modifying the workflow data by executing the application code of the first job.

16. The method of claim 11, wherein initiating, by the first virtual machine, execution of the second virtual machine to execute the second job comprises:

identifying resource requirements associated with the second job based on metadata in a metadata file;

determining that the resource requirements exceed a threshold value;

responsive to determining that the resource requirements exceed the threshold value:

requesting, from the resource manager, the second set of computing resources corresponding to a first portion of the resource requirements; and requesting, from the resource manager, a third set of computing resources corresponding to a second portion of the resource requirements, wherein a sum of the second set of computing resources and the third set of computing resources is at least equal to the resource requirements associated with the second job; and responsive to receiving access to the second set of computing resources and the third set of computing resources:

initiating execution of the second virtual machine; and initiating execution of a third virtual machine.

17. A system comprising:

one or more processors; and memory storing instructions that, when executed by the one or more processors, cause the system to perform:

iteratively executing a plurality of jobs by sequentially transferring control of an execution process among a plurality of virtual machines that respectively and sequentially execute the plurality of jobs at least by:

executing, by a first virtual machine corresponding to a first set of computing resources, application code of a first job of the plurality of jobs;

responsive to completing execution of the application code of the first job, executing, by the first virtual machine, post-application-code wrapper code attached to the application code to determine a second job of the plurality of jobs to be executed subsequent to the first job and a second set of computing resources for executing the second job by a second virtual machine, wherein the second virtual machine executes at least a portion of the second job with the second set of computing resources after the first virtual machine self-terminates;

transferring control of the execution process from the first virtual machine to the second virtual machine at least by:

initiating, by the first virtual machine, execution of the second virtual machine to execute the second job at least by:

requesting, by the first virtual machine from a resource manager, access to the second set of computing resources for the second virtual machine; and initiating execution of the second virtual machine with access to the second set of computing resources for executing the second job; and subsequent to initiating execution of the second virtual machine, self-terminating the first virtual machine at least by returning the first set of computing resources to a pool of available computing resources.

* * * * *